United States Patent Office 3,024,088
Patented Mar. 6, 1962

3,024,088
MAKING MICRO-POROUS, DISCRETE, FEW MICRON SIZE OXIDE COMPOUNDS OF METALS, AND THE PRODUCTS
Sven Robert Palmqvist, Fagersta, Sweden, and Nils H. Brundin, Cairo, United Arab Republic, assignors of three-fourths to Tholand, Inc., New York, N.Y., a corporation of New York, and one-fourth to said Brundin
No Drawing. Filed July 9, 1954, Ser. No. 442,444
12 Claims. (Cl. 23—143)

This invention is that of dry, water-insoluble, powder-like and non-gritty, individually irregularly-shaped, micro-porous particles of an oxygen compound of a metal, such as its oxide, hydroxide or carbonate. The size of these particles is of the order of a few microns and down to about a micron and even significantly smaller in the longest dimension. The extensive micro-porosity characteristic of the individual discrete particles, giving them generally greater internal surface area (i.e. within the pores) than over the exterior of the particle, provides an unusually large surface per unit of weight and an exceptionally low weight per unit of volume. Besides the irregularity in shape of the individual particles, there is general lack of uniformity in shape among them.

The invention includes also the production of such finely divided, micro-porous products by a chemical reaction in water, between salts soluble in it and, before addition to it, admixed in proportions to produce a substantially neutral reaction mixture when dissolved, and which on dissolving in the water react in it to liberate a gas, such as carbon dioxide, and simultaneously to precipitate the water-insoluble carbonate or hydroxide of the metal. From either of the latter the oxide can be prepared by specific drying and heat treatment to avoid destroying the micro-porous structure imparted to the individual particles by the reaction conditions.

Heretofore, water-insoluble hydroxides and carbonates of metals have been produced by ordinary precipitation methods, some involving various types of at least partial neutralizations of alkaline solutions by addition of an acid, or of an acid solution by addition of an alkalinizer as in the precipitation of hydroxides. Metal oxides were prepared by calcining carbonates and hydroxides to drive off carbon dioxide or water respectively. However, such prior methods, although yielding water-insoluble end products of various sizes, do not yield a porous end product having porosity within the discrete particles, and especially one with particles of the order of a few microns and even smaller.

The dry micro-porous, powder-like and irregularly shaped products of the invention, described in the opening paragraph of this specification, at least by their micro-porous structure, have a number of useful advantages over the corresponding water-insoluble oxygen products that do not have their porous structure. The method of the invention provides advantages over the prior processes by yielding the unusually novel products of the invention and by a comparatively simple combination of steps.

Considered broadly, the method of the invention produces these micro-porous products by using as starting material a mixture of water-soluble salts of such composition that when the mixture is added to water and dissolves in it, a gas such as carbon dioxide is liberated as part of the reaction and at the same time there is produced a precipitate of the hydroxide or carbonate of the metal desired in the final product. When such starting material mixture is introduced into the water, the reaction involving evolution of the gas such as carbon dioxide and the throwing down of the precipitate of the water-insoluble hydroxide or carbonate (depending on the selected composition of the starting mixture) begins. The evolution of the gas causes the portions of the precipitate as it is formed, as each part of the starting material dissolves, to burst into micro-porous particles of a size of the order of about a few microns and down to as small as one micron and even significantly smaller.

In spite of this extremely small size, the resulting disintegrated precipitate is of highly porous character within the individual discrete particles. The reaction is continued until all of the starting material has been added to, and dissolved in, the water and preferably until precipitation and gas evolution is complete. The precipitated particles then are separated in known manner, e.g. any suitable form of filtration, and can be dried under conditions to avoid crusting and sintering.

The method of the invention is applicable to the production of the water-insoluble carbonate, hydroxide, or oxide of any metal that forms a stable, water-soluble salt either of an inorganic acid, for example, a halide as the chloride, or a nitrate, sulfite or sulfate, or of an organic acid, such as of a carboxylic acid as a formate or acetate, or citrate as in magnesium citrate.

To promote the evolution of carbon dioxide simultaneously with the precipitation of the carbonate or hydroxide or oxide of such a metal upon solution of the starting material mixture in water, the starting mixture must contain a water-soluble carbonate and a water-soluble salt that makes the solution acid when it is dissolved alone in water. One of the ingredients of the water-soluble starting mixture must be a salt of the metal, the carbonate or hydroxide of which is to be precipitated in the reaction after the mixture is added to the water.

Accordingly, when the starting water-soluble salt of the metal to be found in the water-insoluble metal carbonate or hydroxide end product is one that does not give an acid reaction when dissolved alone in water, the starting mixture must contain as a third ingredient a water-soluble solid acid that reacts in aqueous solution with an alkali cation carbonate to liberate carbon dioxide. The function of such solid acid is to react with the carbonate ingredient of the starting mixture to liberate carbon dioxide when the mixture is added to water to be dissolved in it. The expression "an alkali cation" embraces the alkali metal cations and the ammonium ion which is so regularly included with them.

The solid acid substance can be inorganic as a bisulfate whose cation does not form a water-insoluble carbonate or which will form only a water-soluble salt with the anion of the water-soluble starting salt of the metal to be precipitated in the water-insoluble carbonate or hydroxide. Accordingly, the solid acid can be an alkali cation (namely, alkali metal or ammonium) bisulfate. The solid acid can also be organic, for example, the solid carboxylic acid or polycarboxylic acid, citric acid. In the appended claims, the expression "water-soluble, solid acid-reacting substance" is used to designate broadly the inorganic acid salt and solid acid as here described.

However, if the starting water-soluble salt of the metal whose hydroxide or carbonate is to be precipitated, gives an acid reaction when alone dissolved in water, it alone can be relied on as the agent to liberate the carbon dioxide from the starting water-soluble carbonate. Then in such case, the starting mixture can consist of only two ingredients, namely, the water-soluble carbonate and such water-soluble salt of the metal to be found in the water-insoluble end product, which salt gives an acid reaction when dissolved in water. This latter water-soluble salt can be referred to more briefly as the acid-reacting water-soluble salt of the metal in the insoluble end product.

Any of the water-soluble aluminum salts, whether inorganic such as is sulfate, halide as chloride or bromide, or nitrate, or organic as its acetate, citrate, phenolsulfonate, salicylate, or sulfocyanate, is effective as an acid-reacting water-soluble salt of the metal of the insoluble end product. Included also are the aluminum alums with a metal that forms a water-soluble salt with any of the anions in the starting mixture of salts, for example, any of the alkali metal or the ammonium aluminum alums. Accordingly, such acid-reacting aluminum salt generally can be admixed alone with the water-soluble carbonate to constitute the starting mixture.

Any alkaline-reacting carbonate can be used as the carbonate ingredient of the starting material, so long as its cation forms a water-soluble salt with the anion of any other ingredient of the starting mixture. Thus, there can readily be used an alkali metal or ammonium carbonate or bicarbonate. These can be refererd to broadly as a water-soluble alkaline carbonate.

The water-soluble salt to be used as a starting material containing the metal of the end product (i.e. of the water-insoluble carbonate, hydroxide or oxide) can be briefly referred to also as the water-soluble salt of the end product metal. Such water-soluble salt can be any water-soluble salt, inorganic or organic, of any metal that forms a water-insoluble carbonate, hydroxide or oxide. Among them are the water-soluble alkaline earth metal salts (including magnesium salts with them), inorganic or organic, such as barium, calcium, magnesium, or strontium chloride or other halide, nitrate, nitrite, chlorate, thiosulfate, or acetate, or magnesium citrate, glycerophosphate, lactate, or salicylate, or strontium lactate or salicylate; and water-soluble iron group metal salts, as cobaltous, ferrous or nickel chloride, bromide, iodide, nitrate, sulfate, acetate, ferrous ammonium sulfate, ferrous gluconate, nickel ammonium nitrate, or sulfate, and nickel potassium sulfate; cadmium bromide, chloride, iodide, bromate, nitrate, sulfate, potassium iodide, acetate and salicylate; manganese chloride, borate, manganese ammonium sulfate, acetate, gluconate, or lactate; manganous nitrate or sulfate; copper bromide, chloride, chlorate, fluoride, nitrate, sulfate, copper ammonium sulfate, copper potassium chloride, copper acetate and copper potassium tartrate; zinc borate, bromide, bromate, chlorate, chloride, nitrate, sulfate, and sulfocyanate, or acetate, formate, lactate and salicylate; lead nitrate and acetate; and chromium bromide and acetate; and others.

As already noted the water-soluble salts selected for the starting mixture should be mixed in such proportions that after the reaction is completed, the solution phase of the reaction mixture is substantially neutral. This result is in general obtained by mixing the constituents of the starting mixture in stoichiometric proportions.

It is beneficial for the mixture of starting materials to be uniformly mixed. Such mixing is enhanced if the individual starting substances are not used as lumps but rather are reduced advantageously to granular size such as in ordinary granulated sugar. They can, of course, be used in any convenient size that permits satisfactory mixing.

It is advantageous to stir the reaction mixture as the mixture of starting water-soluble salts is being added to the water.

After the reaction is complete, the precipitate can be separated by decantation and filtration as well as filtration alone. Where adhering water-soluble salts dissolved in solution remaining on the precipitated particles are not detrimental in the ultimate use to be made of the particle, washing of the filter cake is not essential. However, in general it is advantageous as to the utility of the final product and efficient operation to wash the filter cake to free the particles of such water-soluble salts. Where ultimate recovery of such water-soluble salts can be an economic advantage, the wash liquid (i.e. the washings) can be used as the aqueous liquid for dissolving the starting mixture in the succeeding batch.

After the filter cake is removed from the filter, the wet micro-porous particles can be used in the wet state in any application wherein the introduction of water is harmless or in which water is used. However, for preparing the product in dry state, care must be exercised at least in the first stage of the drying that the drying temperature is low enough to avoid the danger of agglomeration of the fine and discrete particles by formation of crusts and sintering. Consequently, at least during its first stage the drying should be conducted at a temperature below approximately 50° C.

After the product is fully dried, it can be heated to higher temperatures without danger of deterioration by agglomeration, formation of crusts or sintering. In that way, a water-insoluble carbonate or hydroxide of the invention (produced by the method of the invention) can be converted to an oxide embraced by the invention, that is to say, by retaining both the finely divided character of the product as well as the unique micro-porous character of the individual discrete particles.

The exceptionally low weight per unit of volume of the micro-porous particles of the products of the invention is in the order of two hundred grams per liter and even less. The surface area of these micro-porous products is seen to be from about one to about two square meters per gram.

The invention is illustrated by, but not restricted to, the following examples:

*Example 1.*—Three hundred and twenty grams of calcined sodium carbonate in ordinary powder form were uniformly mixed with a quantity of granular crushed commercial aluminum sulfate equivalent to three hundred and forty-two grams of $Al_2(SO_4)_3$, and their mixture was run into eighteen hundred milliliters of water. The reaction mixture was thoroughly agitated during the addition of the mixture of water-soluble salts. Promptly upon, and throughout, their addition there went on the ready evolution of carbon dioxide with the simultaneous formation of aluminum hydroxide precipitate. After the addition of the water-soluble salts mixture was completed and carbon dioxide evolution stopped, the precipitated aluminum hydroxide was filtered off and washed until relatively free of sodium sulfate as noted by addition of barium chloride to the washings. The loose filter cake was then spread over a tray and dried in an air stream at between 48° and 50° C. The dry powder-like, free running product averaged between one and three microns in particle size with the individual discrete particles so micro-porous that its surface area, determined by air permeability, indicated from one to two square meters per gram and its density was just below two hundred grams per liter.

*Example 2.*—One hundred grams of a granular crushed commercial aluminum sulfate (containing seventeen percent of $Al_2O_3$) was uniformly mixed with fifty-two grams of calcined sodium carbonate and the mixture was introduced into three hundred milliliters of water with stirring. Simultaneous evolution of carbon dioxide and precipitation of aluminum hydroxide took place throughout the addition of the mixture. When evolution of carbon dioxide had stopped, the precipitated aluminum hydroxide was filtered off. The pH of the filtrate was 7.2. The loose filter cake was washed and then dried in air at a temperature of 50° C. The dry, pulverous product had a particle size of one micron and less. The discrete individual particles were micro-porous (like a sponge). The weight of the vibrated powder was slightly under two hundred grams per liter. The surface area (by air permeability) was about two square meters per gram.

*Example 3.*—One hundred grams of granular ammonium alum was uniformly mixed with forty-three grams of ammonium carbonate powder, and the mixture introduced with stirring into three hundred milliliters of water. Simultaneous evolution of carbon dioxide and precipitation of aluminum hydroxide took place throughout the addition of the mixture. After the evolution of carbon dioxide discontinued, the precipitated aluminum hydroxide was filtered off and washed until relatively free of sulfates. The pH of the filtrate was 6.9. The loose filter cake was air dried at 50° C. The dry, free-running, powder-like product showed the same characteristics as that of Example 2.

In any of the Examples 1, 2 and 3, the specific water-soluble aluminum salt can be replaced by the equivalent amount of any other of the available water-soluble aluminum salts, as indicated by the individual circumstances, and with comparatively similar results.

*Example 4.*—One hundred grams of ferrous sulfate were crushed to granular size and uniformly mixed with fifty-eight grams of sodium carbonate and twenty grams of acid sodium sulfate (sodium bisulfate). This mixture was then introduced into three hundred milliliters of water while stirring. Simultaneous evolution of carbon dioxide and precipitation of ferrous carbonate took place. When the evolution of carbon dioxide discontinued, the precipitated ferrous carbonate was filtered off and washed until reasonably free of sulfates. The loose filter cake was dried in air at 50° C. During the drying the ferrous carbonate was converted to ferric hydroxide of extreme fineness of the order of about two to about three microns. The dry, free-running powder-like product was micro-porous throughout the individual particles.

The ferrous sulfate of Example 4 can be replaced with the equivalent amount of any other compatible water-soluble iron salt, depending on the individual prevailing conditions, with relatively similar results.

*Example 5.*—One hundred grams of magnesium sulfate were uniformly mixed with sixty-three and one-half grams of sodium carbonate and twenty grams of acid sodium sulfate. This mixture was introduced into three hundred milliliters of water with stirring. Simultaneous evolution of carbon dioxide and precipitation of magnesium carbonate took place. When the evolution of carbon dioxide stopped, the precipitated magnesium carbonate was filtered off and washed. The loose filter cake was then dried in air at 50° C. The dry, powder-like magnesium carbonate was a micro-porous powder of extreme fineness. The magnesium sulfate of this example can be replaced by the equivalent amount of any other compatible water-soluble magnesium salt with generally equivalent characteristics in the final dry magnesium carbonate.

The ammonium carbonate of Example 3 and the sodium carbonate of the other examples can be replaced respectively by the equivalent amount of any other water-soluble alkaline carbonate. Likewise the sodium bisulfate of Examples 4 and 5 can be replaced by the necessary equivalent amount of any other compatible, water-soluble, solid acid whether inorganic or organic.

Then also the water-soluble aluminum salt in Examples 1, 2 and 3, the ferrous sulfate of Example 4 and magnesium sulfate of Example 5 can be replaced by the equivalent amount of any other compatible water-soluble salt containing a metal of the end product such as any of those exemplified in column 3, lines 15–42 above. Any such water-soluble salt which gives an acid reaction when dissolved alone in water can be used alone with the water-soluble alkaline carbonate as the constituents of the starting mixture. When such water-soluble salt of the metal of the end product does not give such acid reaction, then there should be included any compatible water-soluble, solid inorganic or organic acid of the type described herein so long as it does not cause the formation of a water-insoluble precipitate other than a carbonate or hydroxide of the metal of the end product.

Among other advantages of the invention as to its method is not only its production of the unusually large surface per unit of weight and exceptionally low weight per unit of volume carbonate, hydroxide or oxide of a metal, which is micro-porous within the individual discrete particles, but also their preparation with the use of a considerably minimum quantity of liquid. These unusually small quantities of liquid that are adequate for conducting the method of the invention not only facilitate the removal of the desired precipitate but also markedly decrease the cost of obtaining the water-insoluble end product with its unique properties and also permit the comparatively low cost recovery from the filtrate of the water-soluble products of the reaction dissolved in it.

The products of the invention with their porosity within the individual discrete particles of such extremely fine size renders them distinctively highly advantageous in various uses where a finely divided solid of low weight per unit volume is beneficial or required, for example, as fillers in compounding of rubber, plastics, cosmetics, toilet powders, toothpaste, etc. The high porosity increases the bond between the rubber or plastic and the micro-porous products of the invention and with desirable resistance to temperature in service. In the cosmetics, powders, and toothpaste, the high porosity improves the facility in compounding with the other ingredients and the covering power and increases the adsorptive capacity over that possible with non-porous heavier particles. The micro-porosity of the products of the invention further makes them advantageously useful as constituents in heat and sound insulators. The micro-porous structure of the particles of extremely small size of aluminum oxide obtained by the invention, makes them unusually advantageously useful as grinding or polishing media with improved characteristics.

While the invention has been illustrated in relation to certain specific embodiments of it, various modifications and substitutions can be made in both the method and the products within the scope of the appended claims which are intended also to embrace equivalents of the specific embodiments.

This application is a continuation-in-part of our co-pending application Serial No. 722,288 filed January 15, 1947, now abandoned.

What is claimed is:

1. A non-gritty, finely divided powder-like product consisting of water-insoluble, individually irregularly-shaped, micro-porous particles up to about a few microns in size; which product has a general lack of uniformity in shape among the particles, has a surface area of the order of about two square meters per gram and a density of less than about two hundred grams per liter, and is a member of the class consisting of aluminum hydroxide and aluminum oxide; obtained by the method which comprises mixing together, in solid state and in proportions to give a substantially neutral reaction solution after reacting together when dissolved in water, an acid water-soluble aluminum salt and inorganic, water-soluble carbonate having a cation that forms a water-soluble salt with the anion of the aluminum salt; introducing the mixture into water to bring about as the mixture dissolves therein a rapid reaction liberating carbon dioxide gas and forming a micro-porous, pulverous precipitate of aluminum hydroxide; separating the precipitate from the solution, washing it, and drying it at a temperature not exceeding about 50° C.

2. A product as claimed in claim 1, wherein the product is aluminum oxide.

3. A product as claimed in claim 1, wherein the product is aluminum hydroxide.

4. The method of producing a finely divided, micro-porous, water-insoluble oxygen compound of a metal selected from the class consisting of aluminum, iron and magnesium, which compound has a particle size of about three microns and smaller and is a member of the class consisting of the hydroxide, oxide, and carbonate, of said metal; which method includes the combination of steps which comprises (A) mixing together, in solid state and so proportioned as to give a substantially neutral reaction solution after reacting together when dissolved in water, a mixture of water-soluble reactants which on solution in water react together to liberate carbon dioxide and which mixture contains (*a*) a water-soluble alkaline-reacting carbonate and (b) a water-soluble salt of the metal which is to be in the water-insoluble micro-porous end product, and has as one of its ingredients an acid-reacting constituent selected from the class consisting of (i) the specific water-soluble salt included of the metal which is to be in the end product and (ii) an added water-soluble solid acid-reacting substance; the anion in the water-soluble salt of the metal which is to be in the end product being such that forms a water-soluble salt with the cation of the carbonate and of any added solid acid-reacting substance, and the anion of the latter being such as to form a water-insoluble salt with the metal which is to be in the end product; (B) introducing the mixture into water to bring about the reaction liberating carbon dioxide and concurrently thereby forming a micro-porous precipitate of the water-insoluble oxygen compound selected from the class consisting of the carbonate and hydroxide of the metal of the end product; and (C) separating the precipitate from the solution; and drying the precipitate under conditions to avoid crusting and sintering.

5. The method of producing a finely divided, micro-porous, oxygen compound of aluminum selected from the class consisting of its hydroxide and oxide, which comprises mixing together, in solid state and in proportions to give a substantially neutral reaction solution after reacting together when dissolved in water, an acid water-soluble aluminum salt and an inorganic, water-soluble carbonate having a cation that forms a water-soluble salt with the anion of the aluminum salt; introducing the mixture into water to bring about a rapid reaction liberating carbon dioxide gas and forming a micro-porous, pulverous precipitate of aluminum hydroxide, separating the precipitate from the solution, washing it and drying it at a temperature not exceeding about 50° C.

6. The method as claimed in claim 5, wherein the aluminum salt is an aluminum sulfate and the carbonate is selected from the class consisting of the alkali metal and ammonium carbonates.

7. The method as claimed in claim 5, wherein the aluminum salt is aluminum sulfate and the carbonate is a sodium carbonate.

8. The method of producing a finely divided micro-porous aluminum oxide, in which an acid water-soluble aluminum salt and a water-soluble carbonate in proportions to give a substantially neutral reaction solution after reacting together when dissolved in water are mixed together in solid state; this mixture thereafter is introduced into water to bring about a rapid reaction in liberating carbon dioxide and forming a pulverous precipitate of micro-porous aluminum hydroxide; the precipitate thereafter is separated from the solution, washed and dried at a temperature not exceeding about 50° C., after which the dried precipitate is heated to such a temperature that the hydrate water is driven off and the aluminum hydroxide thus converted into finely divided micro-porous alumina.

9. The method as claimed in claim 4, wherein the water-soluble salt of the metal of the end product is a ferrous salt and the carbonate is an alkali cation carbonate and the solid acid-reacting substance is an alkali cation bisulfate.

10. The method as claimed in claim 9, wherein the ferrous salt is ferrous sulfate and the carbonate is an alkali metal carbonate and the bisulfate is an alkali metal bisulfate.

11. The method as claimed in claim 4, wherein the water-soluble salt of the metal of the end product is a magnesium salt and the carbonate is an alkali cation carbonate and the solid acid-reacting substance is an alkali cation bisulfate.

12. The method as claimed in claim 11, wherein the magnesium salt is magnesium sulfate and the carbonate is an alkali metal carbonate and the bisulfate is an alkali metal bisulfate.

References Cited in the file of this patent

UNITED STATES PATENTS

| | | |
|---|---|---|
| 842,452 | Flugge | Jan. 29, 1907 |
| 932,795 | Maignen | Aug. 31, 1909 |
| 2,053,208 | Curtis | Sept. 1, 1936 |
| 2,093,454 | Kistler | Sept. 21, 1937 |
| 2,137,638 | Sondern et al. | Nov. 22, 1938 |
| 2,222,969 | Kistler | Nov. 26, 1940 |
| 2,247,624 | Wall | July 1, 1941 |
| 2,584,286 | Pierce et al. | Feb. 5, 1952 |

FOREIGN PATENTS

| | | |
|---|---|---|
| 508,911 | Great Britain | July 1, 1939 |
| 88,535 | Switzerland | Mar. 1, 1921 |

OTHER REFERENCES

Jacobson: "Encyclopedia of Chemical Reactions," publ. by Reinhold Publ. Co., New York, vol. I (1946), pp. 77 and 100; vol. IV (1951), pp. 47 and 85.